A. L. BARBE.
MANUFACTURE OF A WHITE PIGMENT.
APPLICATION FILED AUG. 5, 1921.
1,396,914.
Patented Nov. 15, 1921.
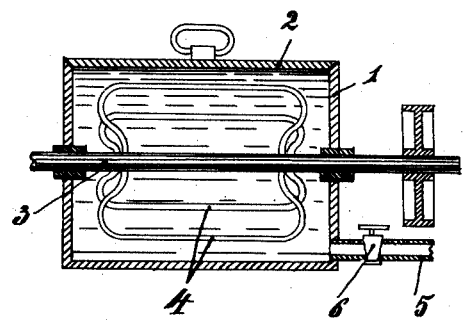

UNITED STATES PATENT OFFICE.

AUGUSTE LOUIS BARBE, OF ASNIERES, FRANCE.

MANUFACTURE OF A WHITE PIGMENT.

1,396,914. Specification of Letters Patent. Patented Nov. 15, 1921.

Application filed August 5, 1921. Serial No. 490,107.

(GRANTED UNDER THE PROVISIONS OF THE ACT OF MARCH 3, 1921, 41 STAT. L., 1313.)

*To all whom it may concern:*

Be it known that I, AUGUSTE LOUIS BARBE, residing at Asnieres, France, have invented new and useful Improvements in the Manufacture of a White Pigment, for which I have filed applications in France, July 12, 1919, Patent No. 513,186; in England July 24, 1919, Patent No. 140,301, and in Germany Aug. 4, 1919, of which the following is a specification.

This invention relates to improvements in the manufacture of a white pigment.

It has been proposed to treat oxid of antimony with an alkaline solution to neutralize it, but the resultant product so formed contains a certain amount of alkaline sulfates.

The present invention consists in blowing a current of oxygen or compressed air through the antimony oxid after the alkaline solution has been added to eliminate the sulfates formed.

In carrying out the invention the oxid of antimony obtained by the roasting of antimony sulfid is separated and a quantity of the oxid of antimony to be treated is introduced into a vat or the like containing water. There is then added slowly an alkaline solution, preferably lime, and the mixture is then well agitated.

A current of oxygen, or more simply, a current of compressed air, is then admitted into the mixture.

The mixture is then taken from the vat or the like and dried, and the result is a product of a remarkable fineness and perfectly white, and equal to any of the white pigments used in paint.

The annexed drawing represents, by way of example, an apparatus which can be utilized for carrying out the invention.

This apparatus is composed of a vat 1, closed by a cover 2, and in which is mounted an agitator composed of a shaft 3 carrying arms or agitating members 4 of suitable size and shape; at the lower part of the vat is placed a pipe 5 which serves for the insertion of the compressed air, and which is provided with a tap or cock 6. The oxid of antimony in suspension in the water is introduced into the vat; the alkaline solution is then added, and the agitation is then commenced in order to obtain an intimate mixture of the ingredients contained in the vat, and to terminate the operation compressed air is then admitted by opening the tap or cock 6. The resultant oxid is then dried, and in order to prepare a paint, oil is incorporated either by itself or with other suitable products and can be used in place of white lead or zinc white.

I claim:

1. In the production of a white pigment from antimony oxid by treating with alkaline solution, the elimination of any sulfates by blowing a current of air or oxygen through the mixture after the alkaline solution has been added.

2. A commercial product resulting from the process as in claim 1, utilizable as a pigment for paint.

In witness whereof I affix my signature.

AUGUSTE LOUIS BARBE.